Aug. 7, 1962 J. C. SMELTZER 3,048,767
SATURABLE REACTOR POWER SUPPLY
Filed Nov. 19, 1958 2 Sheets-Sheet 1
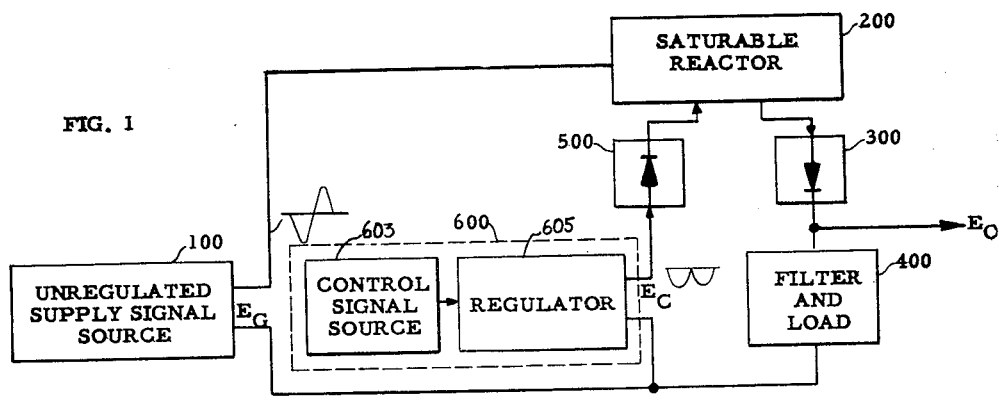
FIG. 1
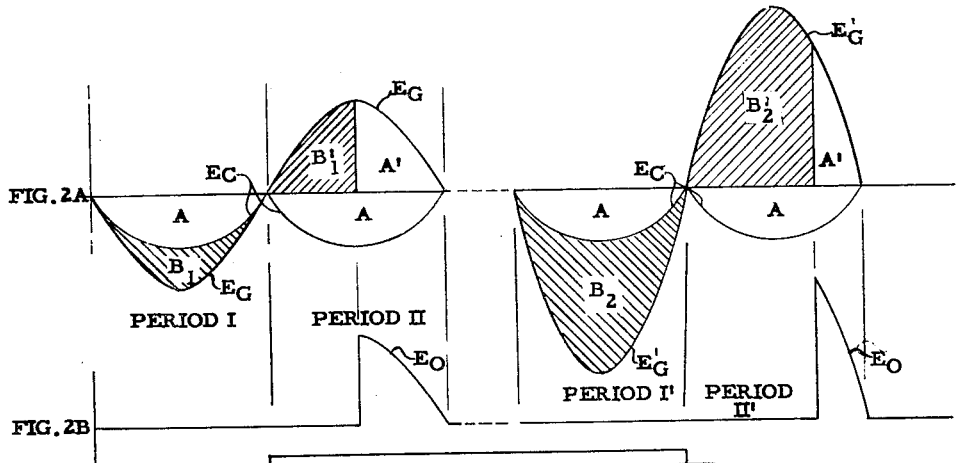
FIG. 2A
FIG. 2B
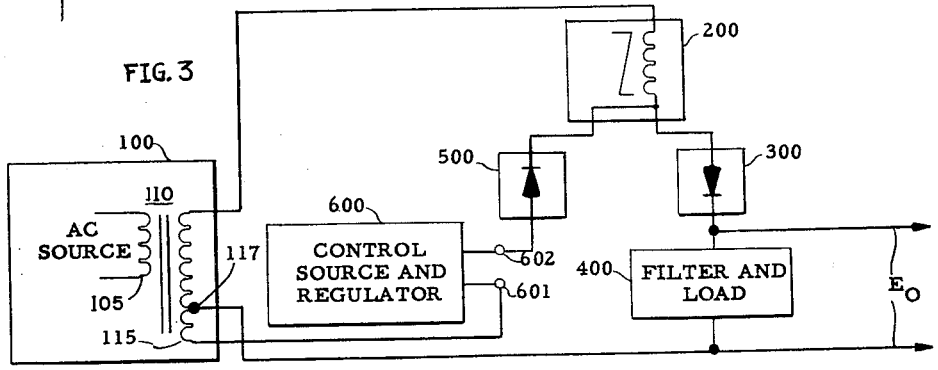
FIG. 3
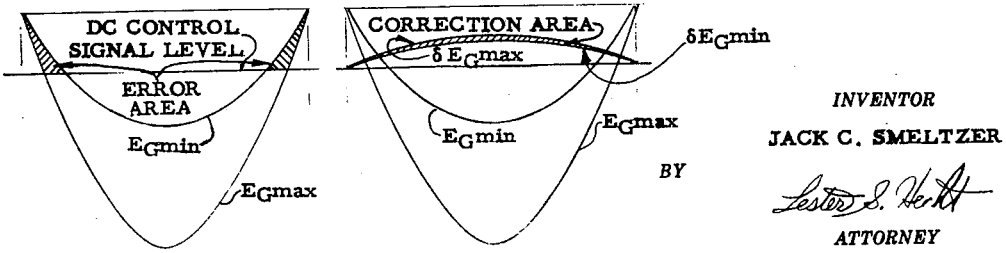
FIG. 4A FIG. 4B
*INVENTOR*
JACK C. SMELTZER
BY
*Lester S. Hecht*
*ATTORNEY*

Aug. 7, 1962  J. C. SMELTZER  3,048,767
SATURABLE REACTOR POWER SUPPLY
Filed Nov. 19, 1958  2 Sheets-Sheet 2

INVENTOR
JACK C. SMELTZER
BY
*Lester S. Hecht*
ATTORNEY

United States Patent Office 3,048,767
Patented Aug. 7, 1962

3,048,767
SATURABLE REACTOR POWER SUPPLY
Jack C. Smeltzer, Torrance, Calif., assignor to Thompson Ramo Wooldridge Inc., Los Angeles, Calif., a corporation of Ohio
Filed Nov. 19, 1958, Ser. No. 774,895
3 Claims. (Cl. 321—25)

This invention relates to regulated power supplies and, more particularly, to an improved type of saturable reactor power supply which is capable of fast response and excellent compensation for changes in amplitude of the A.-C. input supply.

The usual saturable reactor power supply system accomplishes regulation through a control winding on a saturable core, the combination being operated as a magnetic amplifier. That is, means are provided to vary the impedance of the control winding in accordance with changes in the output supply, thereby effecting constant amplitude of the output supply.

While this arrangement operates satisfactorily for slowly varying inputs, and in fact may be preferred therefor, the response to sudden input changes is limited by the inertia inherent in the inductance of the control winding.

Accordingly, power supplies have been developed which are capable of fast response as well as providing a one cycle compensation for changes in amplitude of the alternating-current input signals applied thereto. Such an apparatus is described in U.S. Patent 2,783,315, issued February 26, 1957, to R. A. Ramey, Jr. Briefly, in its basic form, the device described by this patent includes a saturable core having two windings thereon. Each winding forms an element of a separate series loop circuit. One loop circuit, which may be termed an output circuit, includes an A.C. input signal source, one of the windings on the saturable core, a rectifier and a load. The other loop circuit, which may be termed a control circuit, includes an A.C. control signal source generating a signal having the same frequency and phase as the A.C. input source, a D.C. control voltage source and the other winding on the saturable core. Due to the polarity of the rectifiers during the negative going portion of the A.C. signals, current will flow only in the control circuit. This current causes the core to proceed from its original state of saturation by an amount proportional to the difference between the A.C. control signal and the D.C. control voltage. The amount by which the core proceeds from saturation is commonly termed as the "reset." Further, due to the polarity of the rectifiers during the positive going portion of the A.C. signals, current will flow only into the output circuit. Due to this current, the core again saturates, at which time the A.C. input signal is impressed across the load. Thus, it follows that the magnitude of current applied to the load is determined by the magnitude of reset during the previous half cycle. Further, due to the cycle-by-cycle determination of the output signal, variations in the magnitude of the input signal are compensated for on a cyclic basis. Thus, this apparatus should ideally produce a relatively constant output signal independent of variations in the input signal magnitude.

In practice, however, ideal components are not available and it is found that, as the magnitude of the A.C. input signal is increased, the magnitude of the output signal also increases. Further it is difficult to provide an A.C. control source which is regulated both in phase and frequency to the A.C. input signal as is required. Thus, in systems wherein a highly constant supply power is required, the prior art device may be unsatisfactory.

In view of the above, it is object of the present invention to provide a power supply which will produce an output signal which is independent of variations in input signal magnitude.

It is another object of the present invention to provide a simple regulated power supply which does not require an A.C. control signal source regulated both in phase and frequency to an A.C. input signal.

In accordance with the above objects, the present invention makes use of the discovery that in the previously described prior art device the increase in output signal with increase in input signal is substantially of a linear nature. Accordingly, by providing means for developing a signal which is proportional to the A.C. input signal and applying this signal in series with the control signal developed by the control signal source, a power supply results which automatically compensates for any variation in the input signal such that the output signal remains constant regardless of variations in input signal magnitude. Further, such compensation allows the control signal source to be an A.C. signal source, thereby eliminating the necessity of having a control signal source which is capable of generating an A.C. signal regulated both in phase and frequency to the A.C. input signal.

Thus, in a basic form, the present invention includes a saturable reactor, such as a saturable core having a winding thereover. Connected to the saturable reactor are first and second unidirectional conductive devices. The first unidirectional device is coupled to a D.C. signal source for developing a D.C. control signal which controls the reset of the saturable reactor. The second unidirectional device is coupled to a load for receiving current after the reactor saturates. To provide means for saturating the reactor, input means receiving an unregulated input signal are included between the reactor and the D.C. source. In accordance with the present invention, to compensate for variations in input signal magnitude, the input means includes means for developing a correction signal which is proportional to the input signal and means for applying the correction signal in series with the D.C. control signal.

In a preferred embodiment of the invention two saturable reactors are employed in order to provide "full-wave" power to a load. In this embodiment one reactor controls the passage of current to the load during the positive portion of the input supply signal, and the other reactor controls the current transfer to the load during the negative portion of the input supply signal. In this embodiment the control signal is a D.C. signal and is derived from the output signal developed across the load. This is accomplished by filtering the output signal developed across the load and using a D.C. amplifier which receives a suitable division of the filtered output signal and may appropriately have a Zener diode regulating circuit at its input. The D.C. control signal developed in this manner is applied through separate diodes to the reactors through separate windings on the cores thereof.

The novel features which are believed to be characteristic of the invention, both as to its organization and method of operation, together with further objects and advantages thereof will be better understood from the following description considered in connection with the accompanying drawings, in which several examples are ilustrated. It is to be expressly understood, however, that the drawings are for the purpose of illustration and description only, and are not intended as a definition of the limits of the invention.

FIG. 1 is a block diagram illustrating a form of a prior art power supply, an understanding of which is basic to the present invention;

FIGS. 2A and 2B are wave forms illustrating the operation of the system of FIG. 1;

FIG. 3 is a schematic diagram of a basic form of the present invention;

FIGS. 4A and 4B are sections of wave forms illustrating the error which remains after control by a D.C. control signal and one manner of correction;

Figure 5:
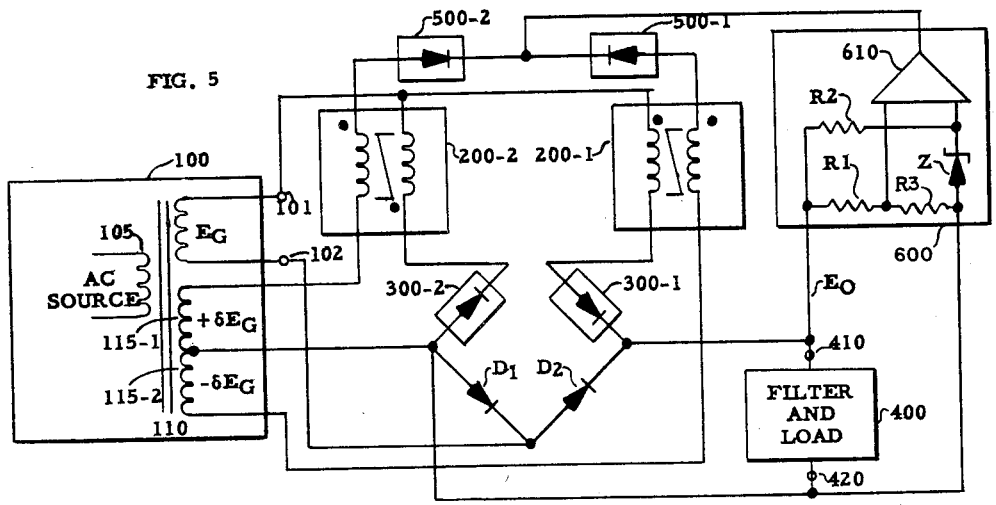
FIG. 5 is a schematic diagram illustrating a full-wave system employing the principles of the invention.

Reference is now made to FIG. 1 which illustrates a modified form of the prior art power supply described in the U.S. Patent 2,783,315 to R. A. Ramey, Jr. Since, as previously mentioned, the present invention represents an improvement over the device illustrated in FIG. 1, an understanding of this device is basic to any analysis of the present invention. As illustrated in FIG. 1 a signal $E_G$ unregulated in amplitude and developed at a supply signal source 100 is applied to a saturable reactor 200. Reactor 200 is coupled for current flow in one direction through a unilateral device 300 to a load 400. The junction between device 300 and load 400 provides the regulated output signal designated as $E_O$.

A second unilateral device 500 is arranged to control the passage of current through saturable reactor 200 in a direction opposite to that which passes through device 300 to load 400. The magnitude of this current—referred to as reset current—is determined by the amplitude of the control signal $E_C$ produced by circuit 600 shown as including a control signal source 603 and a regulator 605.

The general operation of apparatus shown in FIG. 1 may be understood by reference to the wave forms shown in FIGS. 2A and 2B. It will be noted in FIG. 2A that the selected control signal $E_C$ is a rectified, negative-going sinusoid of frequency equal to that of supply signal $E_G$, being of somewhat smaller amplitude such as may be obtained through the use of a voltage divider network energized by signal $E_G$. During the first half-cycle of operation, designated as period I, current is passed through saturable reactor 200 representable by the difference area between signal $E_G$ and signal $E_C$. This difference area is shaded during period I and is designated as $B_1$. Assuming that, prior to period I, reactor 200 was magnetized, reactor 200 is thus partially demagnetized during period I.

During the following half-cycle period designated as period II current flows through saturable reactor 200 in the opposite direction as for period I. This operation continues until saturable reactor 200 becomes saturated at which time it constitutes a very low impedance with respect to the impedance of load 400 and current is then transferred through unilateral device 300 to load 400. Thus in FIG. 2A the shaded area $B_1'$ is equal to the shaded area $B_1$, which may be referred to hereinafter as reset energy. And, in a similar manner, the area $A'$ in period II is substantially equal to area $A$ of period I. This means that the amount of energy transferred to load 400 is controlled by the amplitude of signal $E_C$, rather than by the amplitude of input signal $E_G$. Thus, as will be considered in connection with the present invention, regulation may be accomplished by regulating signal $E_C$. This may be observed from FIG. 2B by noting that during period II the peak amplitude of output signal $E_O$ corresponds to the peak amplitude of signal $E_G$ and that the area corresponds to area $A'$. In a similar manner the magnitude of output signal $E_O$, occurring during period II' corresponds to the area $A'$ which has remained unchanged in spite of the substantial change in the amplitude of signal $E_G$.

While the operation thus far described is ideally perfect in making it possible to produce an output signal $E_O$ which is completely independent of the amplitude of the unregulated input signal $E_G$, in practice it is difficult to accomplish since it specifies a control signal $E_C$ which must be regulated in both phase and amplitude. Consequently it is desirable to employ a D.C. control signal to accomplish the same type of regulation. Further, it has been found that under practical conditions the prior are device illustrated in FIG. 1 produces an output signal, the magnitude of which will increase with increasing magnitude of input signal. As will become apparent with an understanding of the present invention, as illustrated by FIG. 3, the present invention provides a power supply having a D.C. control signal source and providing means for compensating for the increase in output signal magnitude with increase in input signal magnitude.

In the embodiment of FIG. 3 source 100 is shown to comprise an A.C. source applied to the primary winding 105 of a transformer 110, the output winding 115 of which has one end connected to saturable reactor 200 and the other end connected to one terminal 601 of control signal source 600, which is assumed in this case to produce a D.C. signal. Secondary winding 115 of transformer 110 has a tap 117 which is connected to one end of load 400, the other end of which is connected to diode 300. The other terminal 602 of control source 600 is coupled through diode 500 to the junction of reactor 200 and diode 300. In this manner source 600 produces a composite output signal which is equal to its own D.C. signal plus the A.C. signal which is developed between tap 117 and terminal 601. This A.C. signal may be referred to as a correction signal designated $\delta E_G$ and has an amplitude selected to correct for an increase in output signal magnitude with increase in input magnitude.

This correction or compensation may be more clearly understood by reference to FIGS. 4A and 4B. FIG. 4A represents the D.C. control signal and a negative going portion of signal $E_G$ which are utilized in the reset of reactor 200. It is to be noted that current will flow to reset reactor 200 only during that portion of the going cycle of $E_{Gmin}$ and $E_{Gmax}$ which exceeds the magnitude of the D.C. control signal. Due to the magnitude of the D.C. control signal, an increase in the magnitude of $E_G$ will cause less current to flow to reset the reactor than in prior art device illustrated in FIG. 1. This is represented as the error area in FIG. 4A. To compensate for this error area as well as other errors in magnitude, such as the increase in output signal magnitude with increase in input signal magnitude, the correction signal is applied in series with the D.C. control signal. The result is illustrated in FIG. 4B. As previously mentioned, the reset area corresponds to that portion of signal $E_G$ which exceeds $\delta E_G$. Further, as $E_G$ increases from $E_{Gmin}$ to $E_{Gmax}$, the correction signal will increase. Thus an increase in input signal magnitude will cause an increase in the reset area as designated by the correction area in FIG. 4B. This correction area compensates for the error area represented in FIG. 4B as well as for the increase in output signal magnitude which would usually result from the increase in input signal magnitude.

The principle of output signal regulation may also be practiced on a "full-wave" basis where two cores are employed, as is shown in FIG. 5. Many of the circuit connections in FIG. 5 are similar to those previously discussed with reference to FIG. 3 and therefore will not be mentioned in the discussion which follows.

Several distinguishing features will be noted in comparing FIG. 5 with FIG. 3. In general, it will be noted that pairs of reactors 200, diodes 300 and diodes 500 are employed to accomplish the full-wave operation desired. The components with the reference numbers 200–1, 300–1 and 500–1, are arranged in a manner similar to the respective components of FIG. 3. Thus source 600 controls the amount of reset energy which passes through diode 500–1 and saturable reactor 200–1; and diode 300–1 passes energy to load 400 through a second winding on reactor 200–1 after it has been saturated. Dots are shown opposite to the ends of the windings on the saturable reactors to indicate the sense of the signal which is developed. Thus, it will be noted that the dotted ends of the reactor windings are plus when signal $E_G$ is plus and power is sent to the load and that the undotted ends are plus when signal $E_G$ is minus and reset energy is passed through the reactor.

A similar operation occurs for reactor 200–2 and its associated components. In this case signal $-E_G$ draws power through the load and additional diode D2. Diode D1 is included to complete the current path for the power cycle of reactor 200–1.

It will be noted that transformer 110 includes two correction windings 115–1 and 115–2 to provide signals $+\delta E_G$ and $-\delta E_G$ is indicated. These signals are combined with filtered and amplified output signal $E_O$, derived through a regulated amplifier circuit constituting source 600—described in further detail below. The effective combination of the correction signals and the filtered output signal $E_O$ is accomplished across respective reactor reset windings. Thus signal $+\delta E_G$ is applied to one end of the reset winding of reactor 200–2, the other end of which receives the output signal of source 600 through diode 500–2. A similar connection will be noted for applying signal $-\delta E_G$ to the reset winding of reactor 200–1. The schematic arrangement of a suitable form of source 600 is shown to include two input resistors R1 and R2. Resistor R1 is coupled to a voltage dividing resistor R3 and provides an input signal for an amplifier 610 with an amplitude which is the desired proportion of output signal $E_O$. Resistor R2 is coupled to a Zener diode Z which develops a regulated bias for amplifier 610 so that its output signal is maintained within certain regulated limits.

It will be noted that circuit 400 is assumed to include both a filter and a load and therefore signal $E_O$ is assumed to be a slowly varying signal which is substantially insensitive to sudden changes in the unregulated input signal $E_G$. Thus, in this manner, the system develops its own control regulation which is substantially insensitive to rapid transients occurring in the input signal.

In operation, the embodiment of FIG. 5 is similar to that of FIG. 3. Reactor 200–1 supplies positive energy to terminal 410 of load 400 through unilateral device 300–1. In a similar manner, reactor 200–2 is operative during the next half-cycle to supply energy to load 400 through terminal 420, through diode 300–2. During the latter half-cycle of operation power passes from terminal 102 of source 100, through diode D2 and load 400 and then through diode 300–2 and the winding on saturable reactor 200–2 to terminal 101 of source 100.

It should be apparent from the above discussion that the embodiment of FIG. 5 provides an effective means of controlling the full-wave generation of a regulated output signal $E_O$, with a single D.C. control signal which is developed as a function of signal $E_O$ and thus obviates the separate provision of another source.

Figure 6:
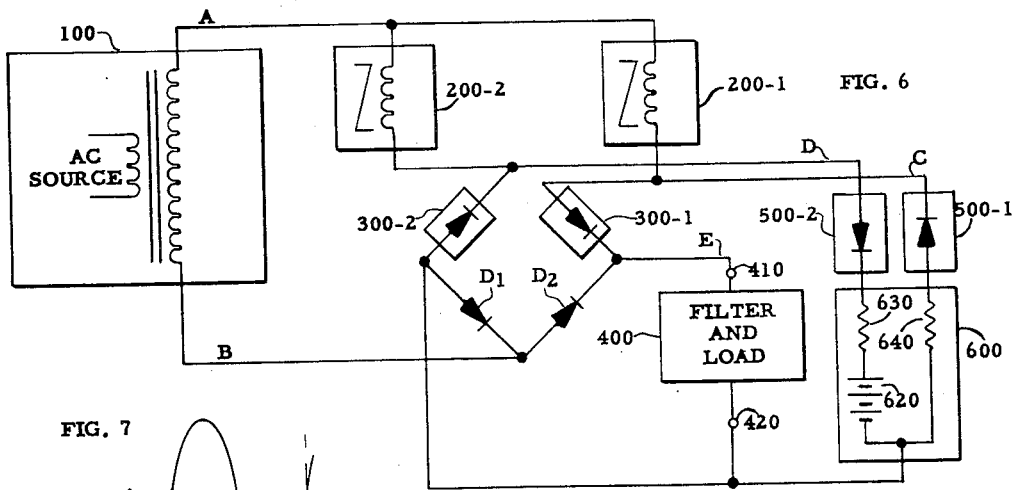
FIG. 6 is a schematic diagram of another variation of a full-wave system according to the invention.

FIG. 6 illustrates another variation of a full-wave system where a D.C. source 600 is employed and single-winding saturable reactors are employed. The structural connections of this embodiment are similar to those considered above. The operation of the arrangement is somewhat different and will be considered with reference to the waveforms of FIG. 7.

Figure 7:
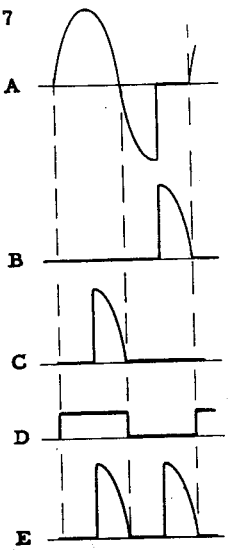
FIG. 7 is a composite set of wave forms illustrating the operation of the embodiment of FIG. 6.

As indicated in FIG. 7, when waveform A appearing at the output of source 100 is positive, power passes through core 200–1 and diode 300–1 to filter and load 400. Signals C, at the anode of diode 300–1 and E, at the cathode thereof, have an energy area dependent upon the previous amount of reset energy passed to core 200–1. As power is passed through core 200–1, reset energy passes through diode 500–2, source 600 and diode D1. It will be noted that source 600 comprises a battery 620 and a series resistor 630 selected to establish the desired regulated signal and current supply. The reset current is represented by waveform D in FIG. 7.

When waveform A of source 100 becomes negative, the other end of source 100 produces a positive signal causing power to pass through diode D2 to load 400 and thence through diode 300–2 and core 200–2 when it is saturated. This then produces signal B at the anode of diode D2 and signal E at the cathode thereof.

While signal A is negative, reset energy passes through core 200–1 being supplied from diode 500–1 and source 600 shown to further include a resistor 640 to establish the desired current for the resetting of core 200–1. Since the area of signal A during the second half-cycle corresponds to the amount of energy necessary to overcome the previous reset of core 200–2, core 200–1 is reset by an amount exactly equal to the previous reset of core 200–2.

From the foregoing description it should now be apparent that the present invention provides an improved power supply employing saturable reactors in a novel type of reset-energy system. The technique of the invention makes it possible to achieve fast-acting regulation with a high degree of accuracy. Both half and full wave systems have been described using either D.C. or a combination of A.C. and D.C. control signals. While several specific embodiments have been illustrated it will be understood that the invention is not so limited but may extend to a broad class of similar circuits as defined in the appended claims.

I claim:

1. A regulated power supply comprising: an input transformer for receiving an unregulated alternating current signal, said transformer including first and second secondary windings, said first secondary winding having first and second terminals and developing a first signal proportional to said unregulated signal therebetween, said second secondary winding having first and second terminals and a tap thereon and developing a first correction signal proportional to said unregulated signal between said first terminal and said tap and developing a second correction signal between said second terminal and said tap; a first saturable reactor including a core and first and second windings thereover; a second saturable reactor including a core and first and second windings thereover; load means connecting the first windings of said first and second reactors; a direct-current signal source for developing a direct-current control signal connected between the second windings of said first and second reactors and said load; means connected to said first secondary winding for applying said first signal to said first winding of said first reactor to drive it to a state of saturation; means connected to said first secondary winding for applying said first signal to said first winding of said second reactor to drive it to a state of saturation; means connected to said second secondary winding for applying said first correction signal in series with said direct-current control signal to reset said second reactor; and means connected to said second secondary winding for applying said second correction signal in series with said direct-current control signal to reset said first reactor.

2. A regulated power supply as defined in claim 1 wherein said direct-current signal source includes means for generating said direct-current control signal in response to signal energy from said load.

3. A regulated power supply comprising: an input transformer for receiving an unregulated alternating-current signal and including a secondary winding having first and second terminals and a tap thereon such that a first signal proportional to said unregulated signal is developed between said first terminal and said tap and a correction signal proportional to said unregulated signal is developed between said tap and said second terminal; a saturable reactor including a core and a winding thereover, one end of said winding being connected to said first terminal; first and second unidirectional conductive devices connected to the other end of said winding; a load connected between said second unidirectional conductive device and said tap; and regulator circuit means connected between said second terminal and said first unidirectional conductive device and responsive to said correction signal for generating a direct-current signal proportional thereto.

(References on following page)

References Cited in the file of this patent

UNITED STATES PATENTS

| | | |
|---|---|---|
| 2,351,975 | Koppelmann | June 20, 1944 |
| 2,783,315 | Ramey | Feb. 26, 1957 |
| 2,790,127 | Hamilton | Apr. 23, 1957 |
| 2,843,818 | Mintz et al. | July 15, 1958 |
| 2,858,499 | Silver | Oct. 28, 1958 |
| 2,880,387 | Belamin | Mar. 31, 1959 |

OTHER REFERENCES

"British Magnetic Amplifier Developments"; Electrical Manufacturing, July 1958, by Ramsay and Glover.

UNITED STATES PATENT OFFICE

CERTIFICATE OF CORRECTION

Patent No. 3,048,767                                  August 7, 1962

Jack C. Smeltzer

It is hereby certified that error appears in the above numbered patent requiring correction and that the said Letters Patent should read as corrected below.

Column 2, line 19, for "A.C." read -- D.C. --.

Signed and sealed this 24th day of September 1963.

(SEAL)
Attest:

ERNEST W. SWIDER
Attesting Officer

DAVID L. LADD
Commissioner of Patents